(12) United States Patent
Goossen

(10) Patent No.: US 6,337,753 B1
(45) Date of Patent: Jan. 8, 2002

(54) OPTICAL POWER EQUALIZER

(75) Inventor: Keith Wayne Goossen, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/217,710

(22) Filed: Dec. 21, 1998

(51) Int. Cl.⁷ .......................... H04J 14/02; G02B 26/00
(52) U.S. Cl. ...................... 359/124; 359/290; 359/291
(58) Field of Search .................. 359/124–134, 359/110, 161, 174, 179, 245, 254, 251, 263, 267, 290, 291, 321, 292, 298, 140, 247, 237, 239, 577–590

(56) References Cited

U.S. PATENT DOCUMENTS

| | | | | |
|---|---|---|---|---|
| 4,756,602 A | * | 7/1988 | Southwell | 350/166 |
| 5,500,761 A | * | 3/1996 | Goossen | 359/248 |
| 5,589,974 A | * | 12/1996 | Goossen | 359/290 |
| 5,646,772 A | * | 7/1997 | Yurke | 359/290 |
| 5,654,819 A | * | 8/1997 | Goossen | 359/291 |
| 5,751,469 A | * | 5/1998 | Arney | 359/291 |
| 5,943,155 A | * | 8/1999 | Goossen | 359/247 |
| 5,949,571 A | * | 9/1999 | Goossen | 359/291 |
| 5,986,796 A | * | 11/1999 | Miles | 359/260 |
| 6,002,513 A | * | 12/1999 | Goossen | 359/291 |
| 6,178,284 B1 | * | 1/2001 | Bergmann | 385/140 |
| 6,215,579 B1 | * | 4/2001 | Bloom | 359/298 |

* cited by examiner

*Primary Examiner*—Jason Chan
*Assistant Examiner*—David C. Payne
(74) *Attorney, Agent, or Firm*—Peter V. D. Wilde; Thomas, Kayden, Horstemeyer & Risley LLP

(57) ABSTRACT

The specification describes an optical power level equalizer device for compensating power tilt in a wavelength division multiplexed lightwave system. The device is a movable membrane device, similar in structure to a Mechanical Anti-Reflection Switch (MARS) device, but in which the movable membrane is made essentially transparent to the center wavelength of the multiplexed signal. Reflectivity increases on one side of the power band and decreases on the other, allowing tilt to be compensated without significant power loss in the center wavelengths. The degree of tilt compensation is dependent on the size of the air gap and can be adjusted dynamically to maintain equal power levels in each channel.

14 Claims, 3 Drawing Sheets

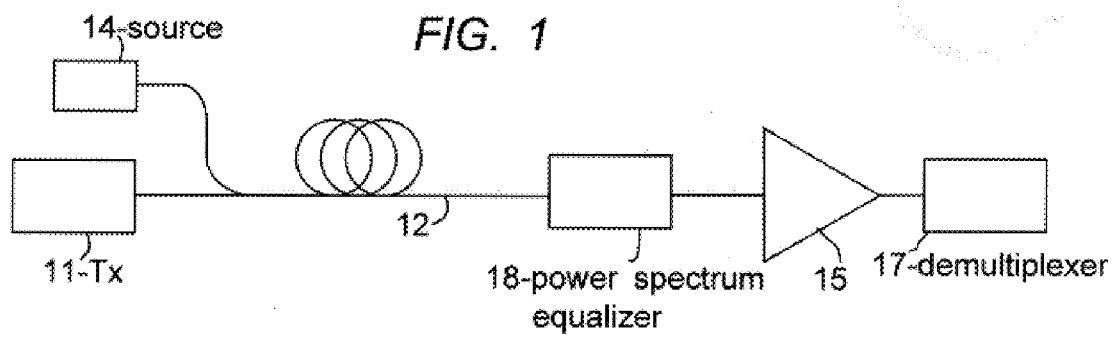
FIG. 1
FIG. 2
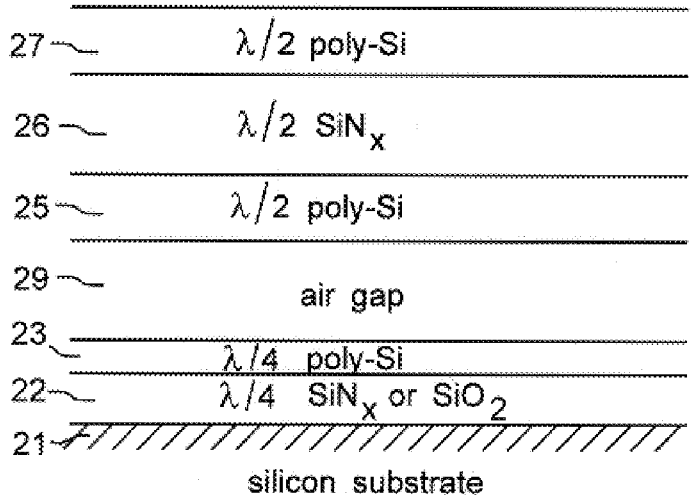
FIG. 3
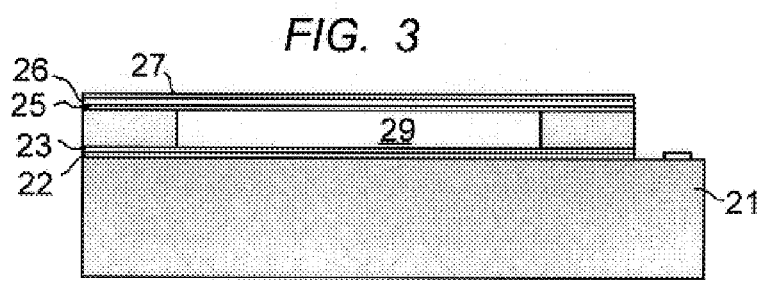

OPTICAL POWER EQUALIZER

FIELD OF THE INVENTION

The invention relates to movable membrane devices for equalizing power levels in wavelength division multiplexed (WDM) systems.

BACKGROUND OF THE INVENTION

Many fiber optic communications systems have been commercialized in which multiple wavelengths are used to carry the signals, thus increasing capacity. These are referred to as Wavelength Division Multiplexed (WDM) systems.

In a typical lightwave WDM system, especially those operating over long distances, the power level of the signal changes as a function of wavelength. This causes some channels to have higher power levels than others, and is known in the art as tilt. Excessive tilt is a serious disadvantage since the individual channels must be compensated for unequal power levels, which raises the cost of the overall system. Techniques for overcoming tilt in WDM systems have been devised. For example, Moving Anti-Reflection Switch (MARS) devices have been proposed for this function. According to this solution, two or more MARS devices, one having positive tilt and the other having negative tilt are used. By adjusting the air gaps of the two devices, power equalization can be obtained over the WDM band of the system.

The basic MARS device structure and operation are well known. The MARS device has a movable conductive membrane suspended over a conductive substrate. With an appropriate electrostatic field the membrane is controllably moved toward, or away from, the substrate thus producing a precisely controlled air gap between the membrane and the substrate. With proper positioning of the membrane with respect to the substrate the MARS device can be switched from a reflecting state to an anti-reflecting state. For more details of the MARS device see K. W. Goossen, J. A. Walker, and S. C. Arney, "Silicon modulator based on Mechanically-Active Anti-Reflection layer with 1 Mbit/sec capability for fiber-in-the-loop applications," *IEEE Phot. Tech. Lett.,* vol. 6, pp. 1119–1121, Sept. 1994.

While this approach to power equalization is effective, other solutions may provide more design options and possibly simper devices.

SUMMARY OF THE INVENTION

An alternative power equalizer has been developed which uses a single movable membrane device, similar to the MARS device, to reduce or eliminate tilt in an optical WDM system. In contrast with the conventional MARS device, the device of this invention produces no change of reflectivity at the center of the wavelength range of the device with changes in air gap. This is achieved by including only layers which are a half optical wave thick (at the center wavelength) in the membrane. Adding one or more half optical wave layers in a dielectric stack results in no change in the reflectivity of that stack at the center wavelength. Therefore at the center wavelength in the device of this invention, the membrane is practically invisible and therefore the reflectivity of the device is independent of air gap. However, at wavelengths less than or greater than the center wavelength, the membrane is visible, and therefore changes in air gap do result in changes in device reflectivity. Since the reflectivity changes are opposite in sign depending on whether the measuring wavelength is less than or greater than the center wavelength, the device produces tilt in its reflectivity spectrum that is dependent on air gap and thus on the electrical bias of the device. Either positive or negative tilt may be produced. Although a plurality of designs including only half optical wave thick layers in the membrane result in this behavior, a specific embodiment is shown that maximizes available tilt while minimizing loss (maximizing reflectivity) at the center wavelength. Dynamic equalization can be achieved using a power spectrum analyzer and a feedback loop to the power level equalizer.

BRIEF DESCRIPTION OF THE DRAWING

FIG. 1 is a schematic diagram of a WDM system employing the movable membrane power equalizer device of the invention;

FIG. 2 is a schematic representation of the layers in a movable membrane power equalizer device of the invention;

FIG. 3 is a schematic view of a movable membrane power equalizer device structure according to the invention;

DETAILED DESCRIPTION

Figure 4:
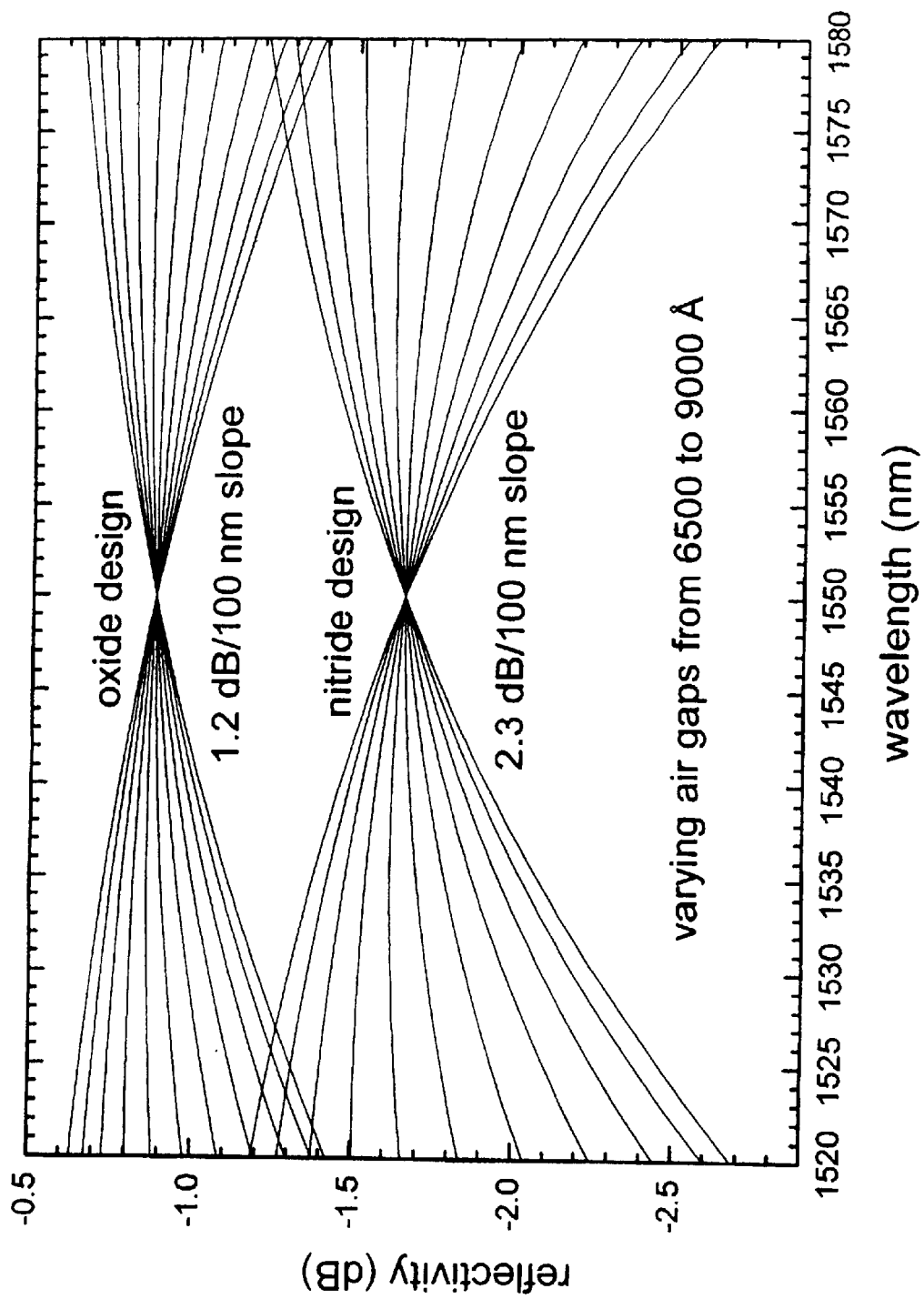
FIG. 4 is a plot of attenuation vs. wavelength for the movable membrane power equalizer device of FIGS. 2 and 3.

With reference to FIG. 1, a typical WDM system is shown schematically with optical transmitter 11, which has a wideband signal comprising multiple channels. The signal traverses transmitting fiber 12, typically a long haul fiber. Additional channels may be added as represented by source 14 coupled into the main transmission fiber. Amplifiers, one of which is shown at 15, are provided along the transmission path. Typically the amplifiers are erbium doped fibers. The multiplexed signal is demultiplexed at the output end by demultiplexer 17. Channels may be added or split off at any point along the transmission path. The addition and subtraction of channels to the main transmission fiber, coupled with other variables such as temperature, microbending losses, etc. cause variations in the optical power of signals in fiber 12. These variations are sometimes referred to as tilt, and are essentially monotonic, with power reduced most at one end of the WDM spectrum, and least at the other. To compensate for these effects, power spectrum equalizer 18 is inserted into the system, preferably before amplifier 15. The power spectrum equalizer device according to the invention is a uniquely designed movable membrane device.

The operating principle of a conventional MARS device is based on the change in an air gap between a suspended membrane, e.g. a silicon nitride film, and the underlying substrate. The membrane has a refractive index equal to the square root of the refractive index of the substrate, and a thickness equal to ¼ of the wavelength of the incident light λ. The membrane is suspended by a web comprising the optically active film, i.e. the silicon nitride film, and metallization on the top side of the film. In some embodiments the metallization is selectively applied to leave a window for the optical beam. The basic structure and properties of the MARS device are described in U.S. Pat. No. 5,751,469 issued May 12, 1998, which is incorporated herein by reference.

In the most fundamental case, if the air gap is equal to zero (contact with the substrate), a typical anti-reflection condition is achieved. If the nitride film is suspended above the substrate by an air gap equal to λ/4 however, a high reflection (>70%) condition is achieved. As could be expected, this relationship would hold for any value of $m\lambda/4$ (m even–anti-reflecting, m odd–reflecting). For a typical MARS device, an initial air gap of $3\lambda/4$ is used to avoid stiction problems during operation and enhance the lifetime of the devices.

The movable membrane is typically a two layer structure of an active layer and a conductive film. In some known embodiments of the MARS structure the movable membrane comprises a three layer structure with the optically active layer sandwiched between conductive films. The conductive films are typically polysilicon or amorphous silicon. This MARS structure is often referred to as a double-poly MARS device, and is described and claimed in U.S. Pat. No. 5,654,819, issued Aug. 5, 1997, which is incorporated herein by reference. The optically active layer is preferably silicon nitride, $SiN_x$, but other materials, e.g. $SiO_xN_y$ with suitable refractive indices may be substituted. Note that the previous MARS devices produce changes in reflectivity of the center wavelength by incorporating a quarter wave layer in the membrane.

The movable membrane device of this invention has much in common with the conventional MARS device but has only one reflecting interface at the center wavelength of interest. The movable membrane is designed to be transparent to this wavelength, which, in structural terms, means that all the layers of the movable membrane are half wave layers. This structure is illustrated schematically by FIG. 2. Substrate 21 comprises silicon coated with quarter wave layers 22 and 23 of the materials and thickness indicated. These layers improve the reflectivity of the substrate but in principle can be omitted. The movable membrane may comprise any number of half wave layers but in the preferred embodiment comprises three layers, 25–27. $SiN_x$ layer 26 is the optically active layer, and is bounded by polysilicon layers 25 and 27 to provide means for controlling the electrical field across air gap 29.

The device of the invention may be designed with any membrane composed of layers which are multiples of a thickness of a half wavelengthin the center wavelength range of the incident beam (as measured in material of the membrane). A metal electrode may be provided in the form of a hole in the center to allow passage of the beam. As already suggested, the membrane may be multi-layered. In a preferred embodiment, the membrane has three layers, i.e. a structure similar to the so-called double-poly structure, but with each layer having a thickness equal to a half wave of the incident beam.

The device of the invention, using layers as illustrated and numbered schematically in FIG. 2, is shown in FIG. 3. The silicon substrate is shown at 21 with the movable membrane comprising active optical layer 26, and metallization layers 25 and 27 on either side of the active layer. Metallization as referred to here may be any suitable conductive material, preferably polysilicon. The substrate is coated with optically active layer 22 and metallization 23. These layers increase the finesse of the device. The air gap is shown at 29.

In the primary example, where layers 23, 25 and 27 are polysilicon, and the device operates with a signal beam having a center wavelength at or near 1550 nm, the thickness of half wave layers 25 and 27 is approximately 2214 Angstroms, and the thickness of quarter wave layer 23 is approximately 1107 Angstroms. These are preferred values but operable devices can be made in which the thickness of these layers can be multiples of these values, as known in the art. The thickness of silicon nitride layer 26 is preferably approximately 4144 Angstroms for the example given. Layer 21 has a preferred thickness of 2072 Angstroms if it is silicon nitride, or 2691 if silicon dioxide is chosen for this layer.

The variation of reflectivity (or attenuation) vs. wavelength for the device of FIGS. 2 and 3 is shown in FIG. 4. Reflectivity in dB is plotted vs. wavelength in nanometers for two device structures. The series of curves at the upper region of the plot are for a device with an $SiO_2$ layer 22. The series of curves in the lower portion of the figure is for a device with a $SiN_x$ layer 22. The spacing between curves in the FIG. 4 represents a change in air gap of approximately 250 Angstroms. As is evident, the curves are nearly linear, which allows for very close compensation of linear variations in power level due to system changes. The amount of compensation can be adjusted, as evident from these data, by varying air gap 29. Both positive and negative tilts can be compensated.

Figure 5:
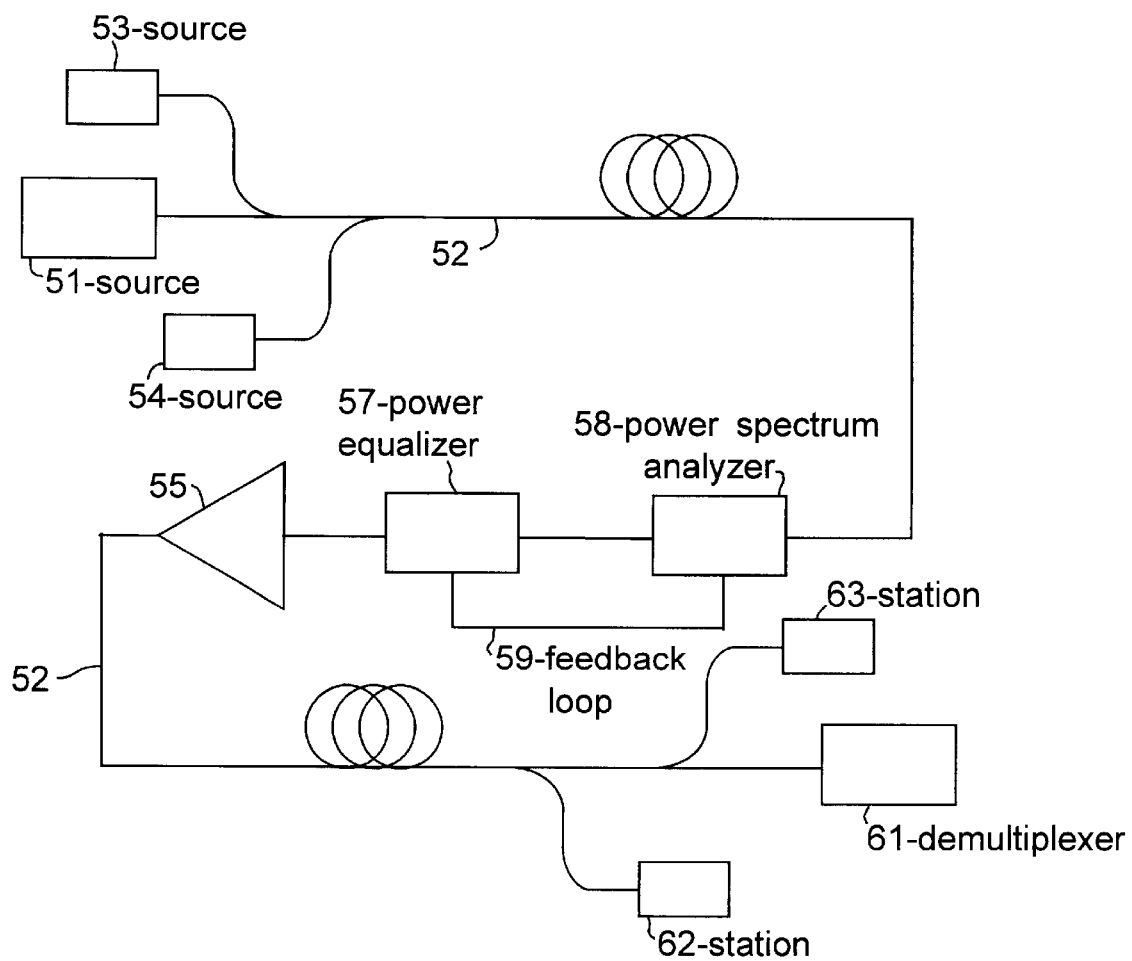
FIG. 5 is a schematic representation of a feed back system for dynamic power equalization.

The invention is preferably implemented in a dynamic mode in which the power spectrum of the multiplexed signal as it arrives at the power equalizing device is monitored, and the power spectrum adjusted by changing the voltage on the power equalizing device. This can be done continuously, or via a sampling program. If the system variables are known and relatively stable, sampling can be relatively intermittent. A suitable feedback arrangement is shown schematically in FIG. 5. The multiplexed signal from signal source 51 propagates along long haul fiber 52. Signals from sources 53 and 54 are added to the main channel and represent customers or groups of customers added to the main trunk at different locations. At the repeater location, represented by amplifier 55, power spectrum equalization is performed by power equalizing device 57. The air gap of the device is adjusted, in the manner described above, in response to power spectrum analyzer 58, with the appropriate equalization signal fed back to the power equalizing device via feedback loop 59. It is preferred that the power spectrum adjustment be made just prior to the amplification stage, but other arrangements are also useful. The amplified signal continues along fiber 52 to the next repeater, or to the system output, represented by demultiplexer 61. Channels may be split from the main channel at any point, as indicated by receiving stations 62 and 63.

Reference herein to polysilicon is for convenience, it being understood by those skilled in the art that amorphous silicon can be substituted. Suitable deposition techniques for layers 22, 23, and 25–27 are well known and not part of the invention. The layers can be formed e.g. by LPCVD. The thickness of the conducting layers are given in terms of fractions of the wavelength of the WDM signal as measured in the material of interest. An advantage of using polysilicon for layers 25 and 27 is that the index of refraction of these layers essentially matches the index of refraction of substrate 21. Polysilicon is also relatively transparent to laser radiation of interest, i.e. 1.3 $\mu$m and 1.55 $\mu$m. Techniques for tailoring the refractive index of a material are well known and described in, e.g., Smith et al, "Mechanism of $SiN_xH_y$ Deposition From $N_2$—$SiH_4$ Plasma", J. Vac. Sci. Tech. B(8), #3, pp 551–557 (1990).

It should be evident from the above that in the devices of the invention an important feature is a variable air gap, with means for applying an electrical field across the air gap. The means in this case includes conductive layers on either side of the air gap. In the embodiments shown, it is convenient for the polysilicon layers to serve this function. Appropriate contacts to these layers are made by well known techniques. Alternatively, layer 25 can be non-conducting, e.g. near intrinsic polysilicon. In this case a metal contact layer, e.g. tin oxide, can be formed over the insulating layer 26. If the metal contact layer is opaque to the signal wavelength, a window may be provided in the contact layer. Similar variations may be made on the substrate side of the air gap. If the lower polysilicon layer 23 is not sufficiently conductive, the electrical contact can be made directly to the substrate. If the substrate is insulating, a metal contact layer can be provided on the surface of the substrate.

The optical wavelengths of most interest in current photonic devices are 1.3 μm and 1.55 μm. These wavelengths correspond to spectral regions of ultra high transparency and resultant transmission efficiency in silica based transmission media. However, the invention described above is useful for any optical wavelength, e.g. 0.5–2.0 μm with suitable adjustment of the device dimensions.

The invention has been described in terms of a silicon substrate and silicon optoelectronic devices. It will occur to those skilled in the art that various forms of hybrid structures can also be used thus allowing flexibility in the choice of material for the optoelectronic device. In particular, gallium arsenide devices are widely used in lightwave technology. In the case of the movable membrane device of the invention, the electrical function of the device does not require a semiconductor material and a wide variety of conductive materials for the device substrate are possible. In the context of this disclosure, semiconductor materials such as silicon are intended to be within the definition of conductive materials. For other forms of optical modulators, crystal materials like lithium niobate could be used. In each of these cases the active device itself can be mounted or bonded on a silicon substrate to obtain the advantages of this invention.

Various additional modifications of the invention may be made by those skilled in the art. All variations that basically rely on the teachings through which this invention has advanced the art, or the equivalents of those variations, are properly considered within the scope of this invention.

I claim:

1. An electrooptic device comprising:
   (a) a substrate,
   (b) a membrane having an optically transparent portion and comprising at least one optically active layer with a refractive index $\eta$ and a thickness t,
   (c) means for directing a beam of light on said optically transparent portion of said membrane, said beam of light having a range of wavelengths with a center wavelength $\lambda$, where $t=\lambda/2\eta$,
   (d) a flexible support for positioning the optically transparent portion of said membrane at a first position spaced from said substrate and defining an air gap $d_1$ between said optically active layer and said substrate, and a second position spaced from said substrate defining an air gap $d_2$ between said optically active layer and said substrate, and
   (e) means for applying an electrical bias across said air gap to move said optically transparent portion of said membrane from said first position to said second position.

2. An electrooptic device comprising:
   (a) a substrate,
   (b) a membrane having an optically transparent portion and comprising at least two layers (i) and (ii), wherein layer (i) is an optically active layer with a refractive index $\eta_1$ and a thickness $t_1$, and layer (ii) is a conductive layer with a refractive index $\eta_2$ and a thickness $t_2$,
   (c) means for directing a beam of light on said optically transparent portion of said membrane, said beam of light having a range of wavelengths with a center wavelength $\lambda$, where $t_1=\lambda/2\eta_1$, and $t_2=\lambda/2\eta_2$,
   (d) a flexible support for positioning the optically transparent portion of said membrane at a first position spaced from said substrate and defining an air gap $d_1$ between said layer (i) and said substrate, and a second position spaced from said substrate defining an air gap $d_2$ between said layer (i) and said substrate, and
   (e) means for applying an electrical bias across said air gap to move said optically transparent portion of said membrane from said first position to said second position.

3. The device of claim 2 wherein layer (i) is silicon nitride.

4. The device of claim 3 wherein layer (ii) is polysilicon.

5. The device of claim 4 wherein $\lambda$ is approximately 1550 nm.

6. An electrooptic device comprising:
   (a) a substrate having at least two layers (i) and (ii) on the surface thereof, wherein layer (i) is an optically active layer with an index of refraction $\eta_1$, and a thickness $t_1$, and layer (ii) is a conductive layer having an index of refraction $\eta_2$ a thickness $t_2$,
   (b) a membrane having an optically transparent portion and comprising at least two layers (iii) and (iv), wherein layer (iii) is a conductive layer with a refractive index $\eta_3$, and a thickness $t_3$, and layer (iv) is an optically active layer with a refractive index $\eta_4$ and a thickness $t_4$,
   (c) means for directing a beam of light on said optically transparent portion of said membrane, said beam of light having a range of wavelengths with a center wavelength $\lambda$, where $t_1=\lambda/4\eta_1$, $t_2=\lambda/4\eta_2$, $t_3=\lambda/2\eta_3$, and $t_4=\lambda/2\eta_4$,
   (d) a flexible support for positioning the optically transparent portion of said membrane at a first position spaced from said substrate and defining an air gap $d_1$ between said layer (ii) and said layer (iii), and a second position spaced from said substrate defining an air gap $d_2$ between said layer (ii) and said layer (iii), and
   (e) means for applying an electrical bias across said air gap to move said optically transparent portion of said membrane from said first position to said second position.

7. The device of claim 6 wherein layers (ii) and (iii) are polysilicon.

8. The device of claim 7 wherein layer (i) is selected from the group consisting of silicon dioxide and silicon nitride.

9. The device of claim 8 wherein $\lambda$ is approximately 1550 nm.

10. The device of claim 9 wherein said conductive substrate is a semiconductor.

11. The device of claim 10 wherein said conductive substrate is silicon.

12. The device of claim 6 wherein the movable membrane has an additional layer (v) of a conductive material having a thickness approximately equal to $\lambda/2$, where $\lambda$ is measured in said material.

13. A WDM system comprising:
   (a) WDM signal input means,
   (b) optical amplifier,
   (c) power spectrum analyzer,
   (d) power spectrum equalizer comprising:
      a substrate, a membrane having an optically transparent portion and comprising at least one optically active layer with a refractive index $\eta$ and a thickness t, means for directing a beam of light on said optically transparent portion of said membrane, said beam of light having a range of wavelengths with a center wavelength $\lambda$, where $t=\lambda/2\eta$, a flexible support for positioning the optically transparent portion of said membrane at a first position spaced from said substrate and defining an air gap $d_1$ between said optically active layer and said substrate, and a second position spaced from said substrate defining an air gap $d_2$ between said optically active layer and said substrate, and means for applying an electrical bias across said air gap to move said optically transparent portion of said membrane from said first position to said second position, (e) WDM signal output means, (f) optical fiber interconnections between (a), (b), (c), (d) and (e), and (g) feedback means for transmitting a signal from said power spectrum analyzer to said power spectrum equalizer.

14. A WDM system comprising:

(a) WDM signal input means, (b) optical amplifier, (c) power spectrum analyzer, (d) power spectrum equalizer comprising:

a substrate having at least two layers (i) and (ii) on the surface thereof, wherein layer (i) is an optically active layer with an index of refraction $\eta_1$, and a thickness $t_1$, and layer (ii) is a conductive layer having an index of refraction $\eta_2$ a thickness $t_2$, a membrane having an optically transparent portion and comprising at least two layers (iii) and (iv), wherein layer (iii) is a conductive layer with a refractive index $\eta_3$, and a thickness $t_3$, and layer (iv) is an optically active layer with a refractive index $\eta_4$ and a thickness $t_4$, means for directing a beam of light on said optically transparent portion of said membrane, said beam of light having a range of wavelengths with a center wavelength $\lambda$, where $t_1=\lambda/4\eta_1$, $t_2=\lambda/4\eta_2$, $t_3=\lambda/2\eta_3$, and $t_4=\lambda/2\eta_4$, a flexible support for positioning the optically transparent portion of said membrane at a first position spaced from said substrate and defining an air gap $d_1$ between said layer (ii) and said layer (iii), and a second position spaced from said substrate defining an air gap $d_2$ between said layer (ii) and said layer (iii), and means for applying an electrical bias across said air gap to move said optically transparent portion of said membrane from said first position to said second position, (e) WDM signal output means, (f) optical fiber interconnections between (a), (b), (c), (d) and (e), and (g) feedback means for transmitting a signal from said power spectrum analyzer to said power spectrum equalizer.

* * * * *